(12) United States Patent
Muthukrishnan et al.

(10) Patent No.: US 8,239,331 B2
(45) Date of Patent: Aug. 7, 2012

(54) AUCTION VERIFICATION

(75) Inventors: Shanmugavelayutham Muthukrishnan, New York, NY (US); Michael Rabin, Cambridge, MA (US); Marcel M. Moti Yung, New York, NY (US)

(73) Assignee: Google Inc., Mountain View, CA (US)

( * ) Notice: Subject to any disclaimer, the term of this patent is extended or adjusted under 35 U.S.C. 154(b) by 244 days.

(21) Appl. No.: 12/636,387

(22) Filed: Dec. 11, 2009

(65) Prior Publication Data

US 2011/0071947 A1    Mar. 24, 2011

Related U.S. Application Data

(60) Provisional application No. 61/243,976, filed on Sep. 18, 2009.

(51) Int. Cl.
*G06Q 30/00* (2012.01)
*H04L 9/32* (2006.01)
*H04L 9/30* (2006.01)

(52) U.S. Cl. ................. 705/64; 705/14.71; 705/26.3

(58) Field of Classification Search .......... 705/64
See application file for complete search history.

(56) References Cited

U.S. PATENT DOCUMENTS

| | | | |
|---|---|---|---|
| 6,055,518 A * | 4/2000 | Franklin et al. | 705/37 |
| 8,024,274 B2 * | 9/2011 | Parkes et al. | 705/64 |
| 2003/0074330 A1 | 4/2003 | Asokan et al. | |
| 2008/0208733 A1 | 8/2008 | Robb et al. | |
| 2009/0182667 A1 | 7/2009 | Parkes et al. | |
| 2011/0295752 A1 * | 12/2011 | Parkes et al. | 705/64 |

FOREIGN PATENT DOCUMENTS

| | | | |
|---|---|---|---|
| JP | 2002157457 A | | 5/2002 |
| WO | WO2008/048713 | * | 4/2008 |
| WO | WO 2008048713 A2 | * | 4/2008 |

OTHER PUBLICATIONS

Rabin et al., "Highly Efficient Secrecy-Preserving Proofs of Correctness of Computations and Applications", 22nd annual IEEE Symposium on Logic in Computer Science, IEEE Computer Society, Sep. 2007, 14 pages.*
Rabin et al., "Highly Efficient Secrecy-Preserving Proofs of Correctness of Computations and Applications", 22nd Annual IEEE Symposium on Logic in Computer Science (LICS 2007), 0-7695-2908-9/07, IEEE Computer Society, 14 pages.*

(Continued)

*Primary Examiner* — James D Nigh
(74) *Attorney, Agent, or Firm* — Fish & Richardson P.C.

(57) ABSTRACT

An auction verification subsystem provides verification, without revealing actual bid values, that bid values remained sealed prior to a closing time for the auction and that an announced winning bidder for the auction provided a highest bid. The verification subsystem receives encrypted bids from bidders and generates commitment data based on the bids and provides the commitment data to each of the bidders. In response to receiving the commitment data, the bidders provide decryption keys for the encrypted bids. In turn, the bids are decrypted and an auction is performed using the decrypted bids. The results of the auction can be verified based on bid representations that do not reveal the actual values of bids, thereby maintaining the secrecy of bids. Providing access to an exchange between bidders and the verification subsystem facilitates verification that the auction is performed as a sealed bid auction.

26 Claims, 8 Drawing Sheets

OTHER PUBLICATIONS

Paillier, "Public-Key Cryptosystems Based on Composite Degree Residuosity Classes", J. Stern (Ed.): EUROCRYPT'99, LNCS 1592, pp. 223-238, 1999. cSpringer-Verlag Berlin Heidelberg 1999, 16 pages.*

Notification of Transmittal of the International Search Report and the Written Opinion of the International Searching Authority, or the Declaration for PCT/US2010/049156 dated Apr. 26, 2011,12 pages.
International Preliminary Report on Patentability for PCT/US2010/049156 dated Mar. 20, 2012, 9 pages.

* cited by examiner

AUCTION VERIFICATION

CROSS REFERENCE TO RELATED APPLICATIONS

This application claims the benefit under 35 U.S.C. §119(e) of U.S. Provisional Patent Application No. 61/243,976, entitled "AUCTION VERIFICATION," filed Sep. 18, 2009, which is incorporated herein by reference in its entirety.

BACKGROUND

This document relates to data processing and verification.

The Internet provides access to a wide variety of resources, such as video and/or audio files, as well as web pages for particular subjects or particular news articles. Access to these resources has provided opportunities for advertisements to be provided with the resources. For example, web pages can include advertisement slots in which advertisements can be presented. The advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements. In turn, an auction can be performed and the advertisement slots can be allocated to advertisers according to their bids. For example, when one advertisement slot is being allocated in the auction, the advertisement slot can be allocated to the advertiser that provided the highest bid. When multiple advertisement slots are allocated in a single auction, the advertisement slots can be allocated to set of bidders that provided the highest bids.

The bids that advertisers provide for the auction are generally maintained in secret. For example, the advertisers can provide their respective bids to an auctioneer as sealed (e.g., encrypted) bids so that, even if the advertisers bid is intercepted by a third party, the value of the bid will remain concealed. Additionally, auction results that may be provided by an auctioneer can be provided in a manner that conceals the values of bids that were used in the auction. For example, the auctioneer may only announce the identity of the winning bidder. Thus, the advertiser typically relies on the auctioneer for assurance that the auction results are correct. When the advertiser relies solely on the auctioneer for correctness of auction results, it is possible that the auctioneer can manipulate the data to indicate that the auction results are correct even when the auction results were manipulated by the auctioneer.

SUMMARY

An auction verification subsystem provides verification, without revealing actual bid values, that bid values remained sealed prior to a closing time for the auction and that an announced winning bidder for the auction was a bidder that provided a highest bid. The verification subsystem receives encrypted bids from bidders until a specified closing time for the auction. At the specified time, the verification subsystem generates commitment data that is computed based on the encrypted bids that are being used for the auction. The commitment data is provided to each of the bidders and/or posted to a location that is accessible by the bidders that have submitted bids for the auction. In response to receiving the commitment data, the bidders provide decryption keys for decrypting the encrypted bids. The verification subsystem decrypts the bids, performs the auction based on the bids, and informs a winning bidder of the price that the winning bidder must pay. Thus, using the encrypted bids the sealed bid nature of an auction can be maintained. Additionally, the data exchanged between bidders and auctioneer (i.e., sealed bids, commitment data, decryption keys, and auction results) can be provided to a verifier that can verify the sealed bid nature of the auction.

In some implementations, a secrecy preserving verification of the correctness of an auction results can also be proved based on bid representations that conceal the actual values of the bids. For example, an entity, referred to as a verifier, can submit to the verification subsystem a request for verification of the auction results. In response to the request, the verification subsystem generates bid representations for the bids.

The bid representations can be, for example, vectors including two value components, the modular sum of which are equal to a value of the corresponding bid. The verification subsystem encrypts each value component with a unique encryption key and provides the bid representations to the verifier. Generation of multiple bid representations allows the verification to be performed for a number of different entities without revealing the actual values of the bids.

The verifier can provide a request for one of the value components of the bid representations to be revealed. In response to the request, the verification subsystem provides, to the verifier, decryption keys for revealing the selected value component of the bid representations. The verifier can verify that bid representations for a same bid are value consistent, for example, by confirming that a modular sum of revealed value components are equal to a verification factor that proves value consistency.

The verification subsystem also provides, to the verifier, test sets of values and verification factors that are used in conjunction with the revealed value components to verify that a bid representation for the winning bidder is the highest bid that was used in the auction. Additionally, the verifier can verify that the price paid by the winning bidder is equal to the second highest bid in a similar manner.

In addition to verifying the auction results, the verifier can provide a request to the verification subsystem for verification that the bid representation are value consistent with a verifiable bid representation. In response to the request to verify the value consistency of the bid representations, the verification subsystem can reveal one of the value components for each of bid representations for a same bid. Verification of the value consistency is performed by demonstrating that the revealed value component for each of the bid representations for the same bid differ by a verification factor that is provided by the verification subsystem.

In general, one aspect of the subject matter described in this specification can be implemented in methods that include the actions of receiving, by a data processing device, sealed bids from bidders, each sealed bid being encrypted with an encryption key; providing, by a data processing device, commitment data to the bidders, the commitment data including a hash value generated based on the bids that have been received for an auction and a unique auction identifier for the auction; receiving, from the bidders, a decryption key for each bid, the decryption key being received in response to providing the commitment data; decrypting, by a data processing device, each bid with the decryption key for the bid; and conducting an auction for an item based on the decrypted bids. Other implementations include corresponding systems, apparatus, and computer programs, configured to perform the actions of the methods, encoded on computer storage devices.

These and other implementations can each optionally include one or more of the following features. Receiving the decryption keys can include receiving the decryption key from a secure processor that is configured to provide the decryption key in response to a determination by the secure processor that the commitment data includes a valid auction identifier and that the hash in the commitment data is generated from the bids of the bidders. Providing commitment data can include posting the commitment data to a network location that is accessible by the bidders. Providing commitment data can include the actions generating a concatenated vector of each sealed bid and the unique auction identifier for the auction; computing a hash value of the concatenated vector; and providing the hash value to the bidders, the hash value being the commitment data for the auction. The auction can be a generalized second price auction. Commitment data can be included with the sealed bids. The method can further include the actions receiving, from a verifier, a request to verify auction results for the auction, the auction results specifying a winning bidder; generating, by at least one data processing device, bid representations that conceal actual values of the bids, each bid representation being a vector of at least two value components; encrypting, by at least one data processing device, each of the at least two value components of each bid representation with a different key; generating, by at least one data processing device, at least two test sets and the bid representations including the encrypted value components to the verifier, each of the test sets including a set of values, a sum of which is less than a reference value, the reference value being greater than any bids in the auction; providing, to the verifier, the at least two test sets and the bid representations; and providing, to the verifier, result verification data for verifying the auction results. Receiving a request to verify the auction results can include receiving a request to verify that the winning bidder provided a highest bid relative to other bids used in the auction. Providing result verification data can include the actions providing a set of verification conditions that, when satisfied, demonstrate that the winning bid is a highest bid; generating first decryption keys for the value components of the bid representations; providing the first decryption keys that reveal one component value for each of the bid representations; generating second decryption keys for the test sets; and providing a second decryption key that reveals one of the test sets. Providing first decryption keys can include providing a decryption key for each first value component of each bid representation in the vector of bid representations. Generating bid representations can include generating seed bid representations that are generated based on a seed value provided by the bidder; and generating additional bid representations that are generated independent of the seed value. The method can further include the actions receiving a consistency verification request that includes a request for verification that the additional bid representations are value consistent with the seed bid representations; and providing consistency verification data for verifying that the additional bid representations are value consistent with the seed bid representations. Providing consistency verification data can include the actions generating an additional bid representation and a seed bid representation; providing the additional bid representation and the seed bid representation; generating decryption keys for the additional bid representation and the seed bid representation; providing the decryption keys that reveal a value component of the additional bid representation and the seed bid representation; generating a verification factor being a value that satisfies a value consistency relationship for the component values of bid representations that represent a same bid value; and providing the verification factor.

In general, another aspect of the subject matter described in this specification can be implemented in methods that include the actions of receiving auction results for a sealed bid auction, the auction results specifying bids that were used in the sealed bid auction; generating bid representations for bids, the bid representations including seed bid representations generated based on a seed value and additional bid representations that are generated independent of the seed value; receiving a consistency verification request that includes a request for verification that the additional bid representations are value consistent with the seed bid representations; and providing consistency verification data for verifying that the additional bid representations are value consistent with the seed bid representations. Other implementations of this aspect include corresponding systems, apparatus, and computer programs, configured to perform the actions of the methods, encoded on computer storage devices.

These and other implementations can each optionally include one or more of the following features. Providing consistency verification data can include the action generating an additional bid representation and a seed bid representation; providing the additional bid representation and the seed bid representation; generating decryption keys for the additional bid representation and the seed bid representation; providing the decryption keys that reveal a value component of the additional bid representation and the seed bid representation; generating a verification factor being a value that satisfies a value consistency relationship for the component values of bid representations that represent a same bid value; and providing the verification factor.

Generating bid representations can include the actions receiving a bid seed value from a bidder, the bid seed value specifying a value for initializing a pseudorandom number generator; generating the seed bid representation based on a number from the pseudorandom number generator, each seed bid representation being a two value component representation of a bid; generating first encryption keys based on an encryption seed specifying a value for initializing a pseudorandom number generator; and encrypting each value component of the seed bid representations based on the first encryption keys.

The method can further include the actions generating additional bid representations independent of the bid seed value, each additional bid representation being a two value component representation of the bid; generating second encryption keys independent of the encryption key; and encrypting each value component of the additional bid representations based on the second encryption keys.

In general, another aspect of the subject matter described in this specification can be implemented in methods that include the actions of receiving, by a data processing device, a request from a verifier to verify sealed bid auction results; generating and providing, by a data processing device, bid representations that represent each bid of the auction results, each bid representation being a multi-value component representation of the bid; generating and providing at least two test sets, each test set including a set of values, a sum of which is less than a reference value, the reference value being a value that is higher than any of the bids; in response to a request to reveal a test set, providing data that reveals only one of the at least two test sets; in response to a request to reveal a value component of the bid representations, providing data that reveals only one of the multi-value components of each of the bids; and generating and providing difference data that represents a modular difference between pairs of bids represented by the bid representations, the difference data for each pair of bids including at least two value components, a sum of which equal a difference between the pair of bids. Other implementations of this aspect include corresponding systems, apparatus, and computer programs, configured to perform the actions of the methods, encoded on computer storage devices.

These and other implementations can each optionally include one or more of the following features. Generating and providing the difference data can include for each of the pairs of bids: computing a sum of values from a test set that is concealed from the verifier, the sum of values being equal to a difference between the pairs of bids represented by bid representations; representing the sum of values with two value components that have a modular sum equal to the difference between the pair of bids; and encrypting each of the two value components with a different encryption key; and providing the encrypted value components. Providing data that reveals only one test set from the at least two test sets can include the actions selecting a decryption key for the only one test set; and providing the decryption key to the verifier.

Particular implementations of the subject matter described in this specification can be implemented so as to realize one or more of the following advantages. The integrity of a sealed bid auction can be maintained by bids being maintained in a sealed form (e.g., encrypted) until commitment data that is generated based on the bids that are being used in the auction are provided by the auctioneer. The results of an auction can be verified without revealing actual values of the bid that were used in the auction. Bid representations can be generated and encrypted more efficiently, and with only a small increase in the data stored by an auctioneer, based on a bid seed value and an encryption seed value that is known to a bidder. Multiple bid representations can be computed based on a seed value, thereby reducing the data transmitted between a bidder and the system. Value consistency of bid representations for a same bid can be verified without revealing the actual value of the bid. The winning bid can be verified as a highest bid in the auction by verifying that all of the bids in the auction are less than a reference value and a modular difference between the winning bid and every other bid is also less than the reference value. Multiple entities can verify the auction results without revealing the actual values of the bids when multiple bid representations are available. Auctions can be verified within a specified time constraint (e.g., less than one second) for performing, verifying, and concluding the auction, for example, by using a secure processor to act on behalf of the verifier and not requiring transfer of bid representations across the network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A verification subsystem can be implemented as an element of an advertisement management system in an online environment. In other implementations, the verification subsystem can be implemented in a processing device that communicates over a network or directly with an advertisement management system. The verification system is described below as an element of an advertisement management system that is implemented in an online environment.

Figure 1:
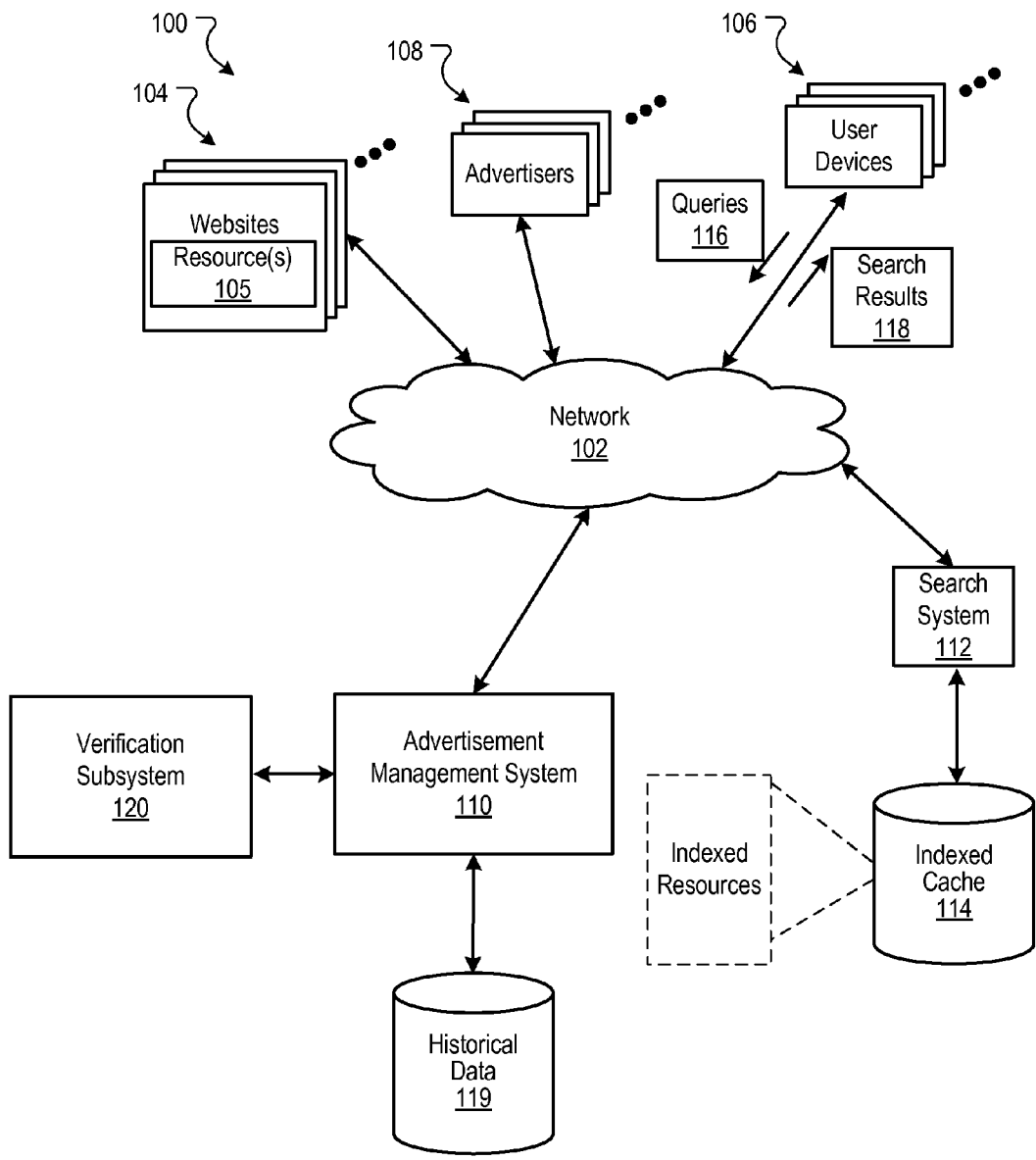
FIG. 1 is a block diagram of an example environment in which an advertisement management system manages advertising services.

FIG. 1 is a block diagram of an example environment 100 in which an advertisement management system 110 manages advertising services. The example environment 100 includes a network 102 such as a local area network (LAN), wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource 105 is any data that can be provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 112 that identifies the resources by crawling and indexing the resources provided by the publishers on the websites 104. Data about the resources can be indexed based on the resource to which the data corresponds.

The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results are requested by a user device 106, the advertisement management system 110 receives a request for advertisements to be provided with the resource or search results. The request for advertisements can include characteristics of the advertisement slots that are defined for the requested resource or search results page, and these requests are provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords associated with a requested resource or a search query 116 for which search results are requested can also be provided to the advertisement management system 110 to facilitate identification of advertisements that are relevant to the resource or search query 116.

The advertisement management system 110 can select, for presentation, advertisements having characteristics matching the characteristics of advertisement slots and that are identified as relevant to specified resource keywords or search queries 116. In some implementations, advertisements having targeting keywords that match the keywords associated with the resource or search query 116 are selected by the advertisement management system 110 to be provided with the resource.

A targeting keyword can match a resource keyword or a search query by having the same textual content ("text") as the resource keyword or search query. For example, an advertisement associated with the targeting keyword "basketball" can be selected for presentation with a resource having the resource keyword "basketball." Similarly, the advertisement can be selected for presentation with a search results page provided for the search query "basketball."

A targeting keyword can also match a resource keyword or a search query by having text that is identified as being relevant to a targeting keyword or search query despite having different text than the targeting keyword. For example, an advertisement having the targeting keyword "basketball" may also be selected for presentation with a resource keyword or search query for "sports" because basketball is a type of sport, and, therefore, is relevant to the term "sports."

The advertisement management system 110 can also select advertisements for presentation in advertisement slots of a resource or search results page based on results of an auction. For example, the advertisement management system 110 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement.

A conversion occurs when a user consummates a transaction related to an advertisement being provided with a resource or search results page. What constitutes a conversion may vary from case to case and can be determined in a variety of ways. For example, a conversion may occur when a user clicks on an advertisement, is referred to a web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

Many different types of auctions can be used to select the advertisements for presentation. First price auctions, generalized second price (GSP) auctions and Vickery-Clarke-Groves auctions are a few examples of auctions that can be performed by the advertisement management system 110 to select advertisements for presentation. A GSP auction allocates an item to a highest bidder, while charging the bidder a price for the item that is equal to the second highest bid. The GSP auction will be used for purposes of example throughout this document, but the description is equally applicable to other types of auctions.

The advertisement management system 110 can perform the auction as a sealed bid auction so that advertisers can prevent other auction participants from learning the bids that were respectively provided by the advertisers. Sealed bid auctions are common when bidders are bidding for similar items, such as advertisement spots, over repeated auctions because the bidders do not want their bids to be known to other bidders. In sealed bid auctions, the advertisers can provide encrypted bids to the advertisement management system 110 so that, even if the bids are intercepted by a third party, the third party would not be able to learn the value of the advertiser's bid without first decrypting the bid.

Bids for an auction can generally be received and/or changed prior to a closing time for the auction. The closing time for an auction is a time at which no additional bids will be accepted for the auction and the bids that have been received can no longer be changed. The closing time for the auction can be, for example, a specified amount of time prior to the time at which the auction is to be performed. For example, the close time for an auction may be 1 minute, 10 minutes, or 1 hour prior to the auction. Alternatively, the closing time can be a time at which a request is received for a web page for which advertisement slots are being auctioned.

When the auction begins the advertisement management system 110 decrypts each bid and performs the auction. At completion of the auction, the advertisement management system 110 selects advertisements based on the results of the auction. In turn, the advertisement management system 110 informs the advertisers whose advertisements will be provided of the price that they will pay for presentation of their advertisement and provides the advertisements for presentation.

Throughout the auction, the advertisement management system 110 maintains each advertiser's bid in confidence. However, without revealing the bids, it can be difficult for advertisers to obtain verification of auction integrity without revealing values of the bids. For example, the advertisers may want to verify that the auction was performed based solely on the bids that were provided by advertisers prior to a closing time for the auction or that the winning bidder provided the highest bid and paid the second highest price. However, the advertisers generally do not want the values of their own bids revealed to other advertisers. Therefore, any verification of auction integrity provided by the advertisement management system 110 needs to be provided without revealing the bids.

The advertisement management system 110 includes a verification subsystem 120 that provides verification of auction integrity without revealing any bids. In some implementations, the verification subsystem 120 provides verification that the auction was performed only with bids that were received prior to a closing time for the auction by providing commitment data to the advertisers at the closing time, as described in detail with reference to FIGS. 2 and 4. The commitment data provides an assurance that no bids were changed or added following the closing time of the auction.

The verification subsystem 120 also provides verification of the auction results without revealing the values of the bids. For example, the verification system can engage in an interactive process with a bidder to demonstrate that a winner of an auction was the bidder that provided the highest bid and, in turn, that the winner paid an amount equal to the second highest bid (or an amount consistent with the type of auction being used). In some implementations, the verification subsystem 120 can verify that a winning bid was the highest bid and/or a bid order without revealing actual values of the bids. The verification can be performed, for example, by proving a series of equations that, when satisfied, provide relative values of the bids that were used in the auction, as described in detail with reference to FIGS. 3, 5, and 7.

Verification of auction integrity and auction results is described throughout this document with reference to interactions between the verification subsystem 120 and a secure processor. The secure processor is a processing device that is configured to perform operations on behalf of the advertiser, for example, in response to data provided by the verification subsystem 120. The secure processor can be implemented, for example, in a server or another data processing device that is in data communication with the verification subsystem 120 and/or the advertisement management system 110. In some implementations, the secure processor is implemented in a server that is controlled by a different party than the party controlling the advertisement management system 110. In other implementations, the secure processor and the advertisement management system are controlled by the same party.

Using a secure processor automates the interactions with the verification subsystem 120 that could otherwise be performed by each of the bidders. Therefore, the operations described as being performed by the secure processor can also be performed by bidder or by another processing device under control of the bidder.

Figure 2:
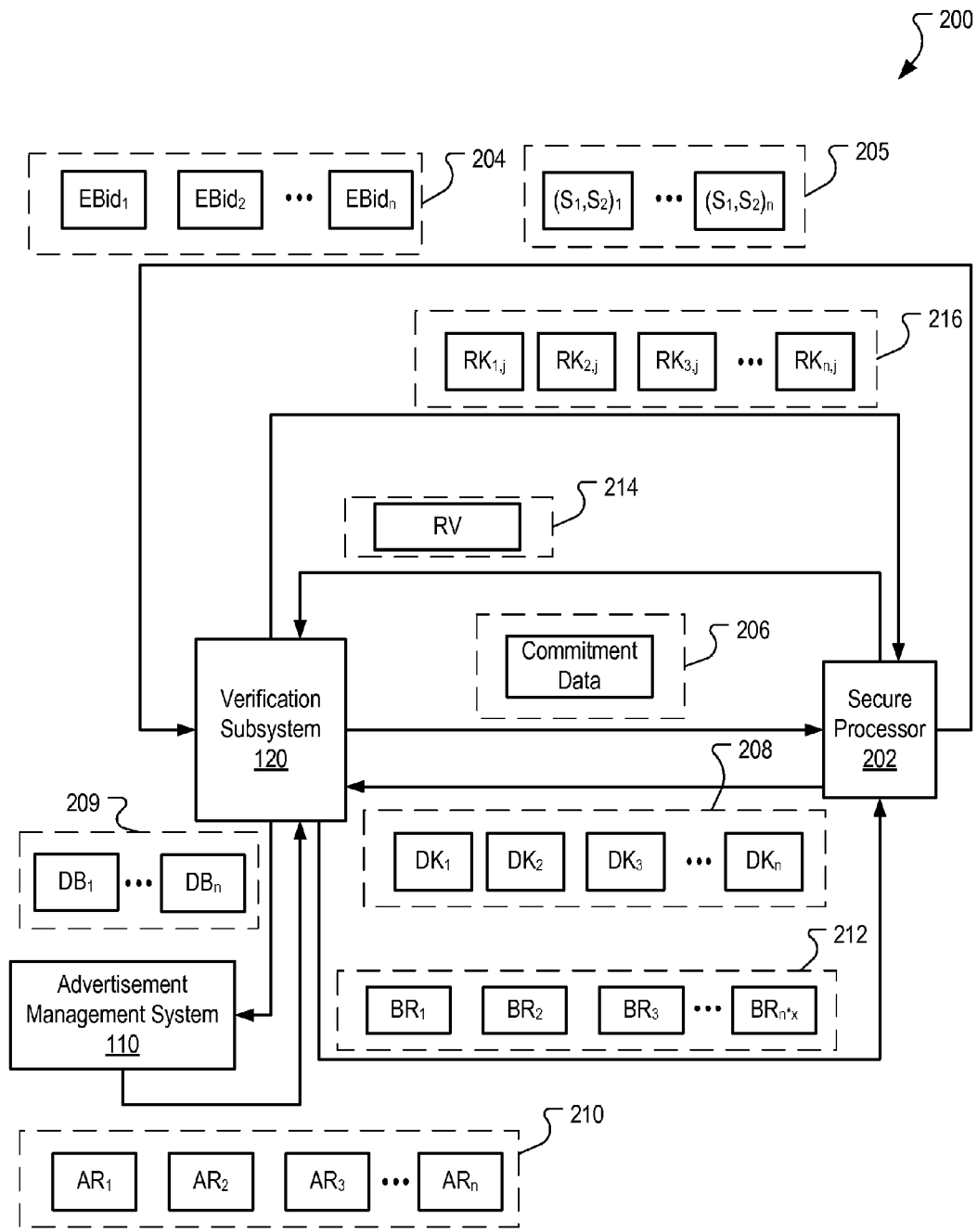
FIG. 2 is a block diagram of an example process flow for providing verification of bids used in a sealed bid auction.

FIG. 2 is a block diagram of an example process flow 200 for providing verification of bids used in a sealed bid auction. The verification subsystem 120 receives, from a secure processor 202, encrypted bids ($Ebid_1$-$Ebid_n$) that define a set of encrypted bids 204 for a sealed bid auction and two seed values 205 (($S_1,S_2$)$_1$-($S_i,S_2$)$_n$) for each encrypted bid. The seed values 205 can be provided by the secure processor at substantially the same time or provided when a request for verification is received by the verification subsystem 120. Each bid can also be provided with a commitment to the bid by the bidder (i.e., a hash of the bid).

In some implementations, each of the encrypted bids can require a separate unique decryption key in order for the bid to be revealed. For example, each bidder can encrypt its respective bid with a symmetric key that is initially unknown to the verification subsystem 120. Therefore, bids remain concealed until the secure processor or bidder provides the key.

The seed values are values that are used to initialize a pseudorandom number generator and, in turn, generate bid representations and decryption keys for the bid representations, as described below. The seed value that is used to generate bid representations is referred to as a bid seed, while the seed value that is used to generate encryption/decryption keys is referred to as an encryption seed.

At a closing time for the auction, the verification subsystem 120 generates commitment data 206 based on the set of encrypted bids 204. In some implementations, the commitment data 206 is a value resulting from a hash of a concatenated vector of the set of encrypted bids 204 and a unique auction identifier for the auction. The hash function used to compute the commitment data is a hash function that is known by the advertisers and/or the secure processor 202 so that the commitment data can be verified by the advertisers.

The advertisement management system 110 provides the commitment data 206 to the secure processor 202 and, in some implementations, posts the commitment data 206 to a network location at which advertisers can view the commitment data 206. Posting the commitment data 206 to a network location provides an assurance to advertisers that each participant of the auction was provided the same commitment data 206. The advertisement management system 110 also provides or otherwise makes the unique auction identifier available to the secure processor 202.

The secure processor 202 computes a hash of a concatenated vector of the set of encrypted bids 204 and the unique auction identifier. In turn, the secure processor can compare the computed hash to the commitment data to verify that the commitment data 206 was computed based on the set of encrypted bids 204 and the unique auction identifier. For example, if the computed hash matches the commitment data, the secure processor can determine that the commitment data was computed using the set of encrypted bids and the unique auction identifier.

In some implementations, the secure processor 202 also verifies that the unique auction identifier has not been previously used. Once the secure processor 202 verifies that the commitment data was computed based on the set of encrypted bids 204, the secure processor 202 provides a set of decryption keys 208 that includes a decryption key ($DK_1$-$DK_n$) for each of the encrypted bids in the set of encrypted bids 204.

The verification subsystem 120 uses the set decryption keys 208 to decrypt the bids in the set of encrypted bids 204, thereby revealing the value of each bid. The verification subsystem 120 provides the decrypted bids 209 ($DB_1$-$DB_n$) to the advertisement management system 110. In turn, the advertisement management system 110 performs an auction based on the decrypted bids 209 and computes auction results ($AR_1$-$AR_n$) that define a set of auction results 210. The set of auction results 210 can include, for example, a list of the decrypted bids, arranged in descending order of bid value. Each decrypted bid can be associated with an advertiser identifier that identifies the advertiser for whom the bid was provided.

The advertisement management system 110 can provide the auction results to the verification subsystem 120. In response to a request for verification of the auction results, the verification subsystem 120 computes, for each of the bids in the auction results, a threshold number of bid representations (BR1-BRn*x). For example, the secure processor 202 can request verification that the winning bidder provided the highest bid and paid a price equal to the second highest bid.

Each bid representation can be a vector having two value components (i.e., a vector (u,v)), where a modular sum of the two value components equals the bid value (i.e., (u+v) modp=bid). For example, a bid of $5.00 can be represented by the vector (14, 8) when a modular base is 17 because (14+8) mod 17=5. The bid representations can be computed, for example, using a pseudorandom number generator that is initialized using one of the seed values (i.e., bid seed value) corresponding to the bid. Bid representations computed based on the bid seed value are referred to as seed bid representations. The number of bid representations computed can be based on a specified number of bid representations that is specified by the bidder or required for each bidder. Computation of the bid representations is described in more detail with reference to FIG. 5.

The verification subsystem 120 encrypts each value component of the bid representations for each bid ($BR_1$-$BR_{n*x}$) with a unique encryption key. A unique encryption key for each bid representation can be generated, for example, using a pseudorandom number generator that is initialized using the encryption seed value corresponding to the bid, as described with reference to FIG. 5. The pseudorandom number generator used to generate the encryption key can be different than the pseudorandom number generator used to generate the bid representations and all of the pseudorandom number generators can be publicly available.

Once the bid representations have been encrypted, a set of encrypted bid representations 212 are provided to the secure processor 202. The set of encrypted bid representations can be provided, for example, as a bid representation matrix that has rows including the bid representations for a single bid and each column including a single bid representation for each of the bids. Bid representations can also be provided on demand as vectors of bid representations without providing the full bid representation matrix.

In some implementations, the verification subsystem 120 can expand the bid representation matrix to include additional bid representations for the bids. These additional bid representations can be generated, for example, independent of the bid seeds. When the additional bid representations are generated independent of the bid seeds, the additional bid representations may not be directly verifiable by the secure processor 202 because the secure processor 202 may not be provided the pseudorandom numbers that were used to generate the bid representations. Therefore, the verification subsystem 120 provides a process by which the secure processor 202 can verify that the additional bid representations are value consistent (i.e., represent the same value) with the seed bid representations.

The secure processor can verify that the additional bid representations are value consistent with the original bid representations by engaging in an interactive process with the verification subsystem 120 by which the value consistency of the additional bid representations can be verified. For example, in response to a request to verify the value consistency of the additional bid representations 214 (RV), the verification subsystem 120 can provide representation decryption keys (216) ($RK_{1,j}$, $RK_{2,j}$, ..., $RK_{n,j}$) for either the first or second value component of two columns (i.e., two vectors of bid representations) of bid representations. In turn, the secure processor 202 can use the revealed value components of bid representations for a same bid to verify that the bid representations for the same bid each represent the same bid value (i.e., are value consistent), as described with reference to FIG. 5.

In response to receiving a request from the secure processor 202 to verify the auction results, the verification subsystem 120 provides result verification data for verifying the auction results without revealing actual bid values. Using the result verification data, the secure processor can verify the auction results without revealing the actual values of the bids.

Figure 3:
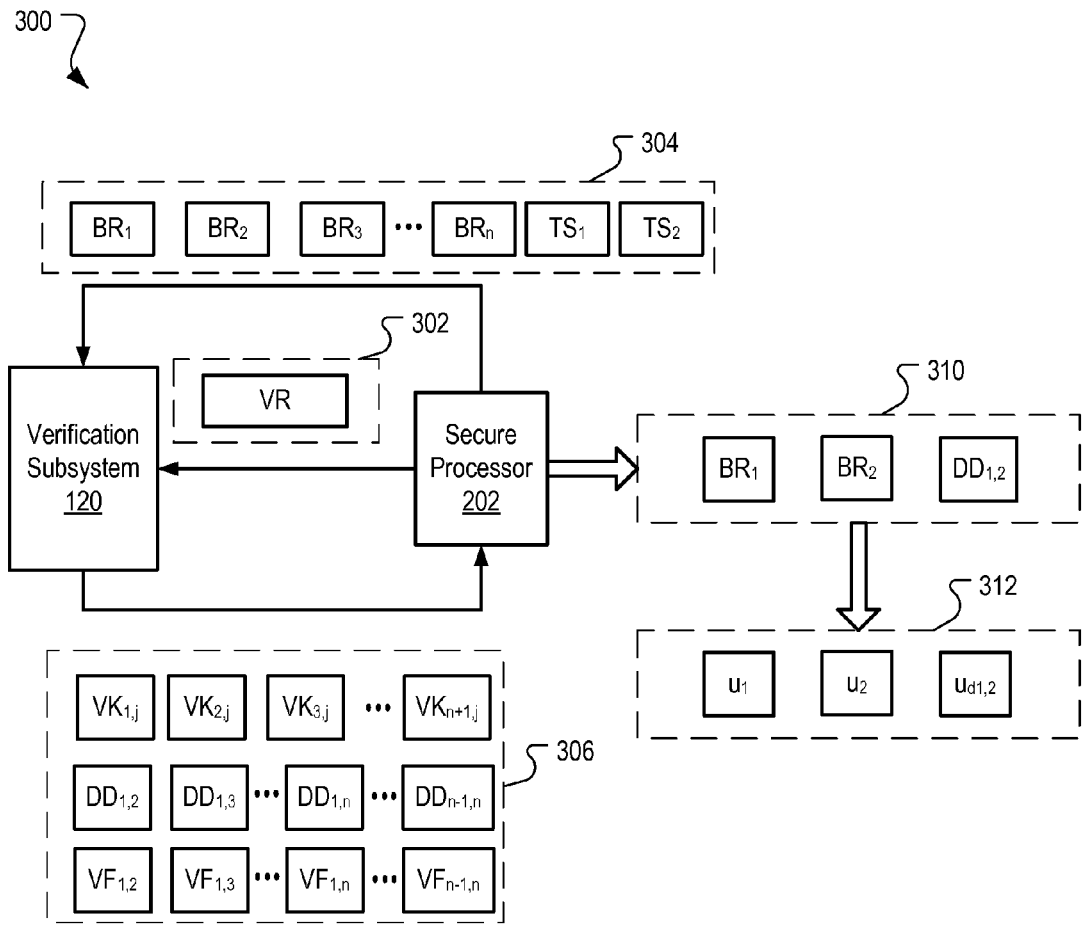
FIG. 3 is an example process flow for verifying auction results without revealing the bids.

FIG. 3 is an example process flow 300 for verifying auction results without revealing the actual values bids. The verification process is initiated, for example, when the secure processor 202 provides a verification request 302 to the verification system 120. In response to the verification request 302, the verification subsystem 120 provides a set of encrypted bid representations 304 and corresponding test sets for the encrypted bid representations 304 to the secure processor 202.

The set of encrypted bid representations can be bid representations for which neither of the value components has been previously revealed to the secure processor 202, for example, during verification of value consistency for the additional bid representations. The set of bid representations can be, for example, a vector of bid representations that includes one bid representation for each of the bids that were used in the auction. The bid representations can be arranged, for example, in an order based on the position of the corresponding bids in the auction results. Additional vectors of bid representations can also be provided, for example, based on a confidence factor, as described with reference to FIG. 5.

The test sets (TS1, TS2) that are provided with the set of bid representations each include a set of values that are used to verify the auction results. The test sets include a set of values computed from powers of two (i.e., $2^X$), the sum of which are less than a reference value. For example, if the reference value is 17, a valid test set can include the values (0, 1, 2, 4, 8) because the sum of the values of the test set (i.e., 15) are less than 17.

The reference value is selected so that no bid will be higher than the reference value and so that a modular base used for verifying the auction results is at least twice as large as the reference value. For example, the reference value is set to $2^{20}$, for example, when the modular base for verifying the auction results is $2^{32}$. In this example, each test set can include a unique permutation of the test set including the values 0, $2^1$, $2^2$, ..., $2^{19}$. Two test sets are provided so that a verifier can reveal all of the values of one test set to verify that the test set is a valid test set while the other test set can remain concealed for verifying the auction results, as described in more detail with reference to FIG. 7.

The verification subsystem 120 can also provide the secure processor 202 with result verification data 306 to facilitate verification of the auction results. The result verification data 306 can include, for example, difference data ($DD_{1,2}$-$DD_{n-1,n}$) that represents a modular difference between each pair of underlying bids that are represented by pairs bid representations (e.g., $BR_{1,2}$-$BR_{n-1,n}$). For example, difference data $DD_{1,2}$ for a pair of bids can be a vector having two value components, the modular sum of which equals a difference between the pair of bids. The difference data can be generated, for example, from a sum of values selected from the test set (TS1 or TS2) that was not revealed to the secure processor, as described with reference to FIG. 7. Generating the difference data based on a sum of values selected from the test sets assures an advertiser that the value represented by the difference data is less than the reference value.

The result verification data 306 can also include value component keys (i.e., VK1,j . . . VKx,j, where j is either 1 or 2) for either the first or the second value component for each bid representation (BR1-BRn) and the difference data ($DD_{1,2}$-$DD_{n-1,n}$) representations. The result verification data 306 also includes a verification factor ($VF_{1,2}$-$VF_{n-1,n}$) for each pair of bid representations and corresponding difference data, as described in more detail with reference to FIG. 7.

The result verification data 306 can be provided in response to a request from the secure processor for verification data. The request for verification data can specify, for example, that the secure processor will reveal either the first or second test set (i.e., TS1 or TS2) and verify the auction results with either the first or second value component of each bid representations and the corresponding difference data.

The secure processor 202 selects two bid representations (e.g., BR1 and BR2) and a corresponding set of difference data (e.g., $DD_{1,2}$) 308 for continuing the verification process. The secure processor 202 uses the result verification data 306 to reveal one value component (e.g., ($u_1$, $u_2$, $u_{d1,2}$) 312) for each of the bid representations $BR_1$-$BR_2$ and the difference data $DD_{1,2}$. In turn, the secure processor 202 can use the revealed value components to verify that each of the bids corresponding to the bid representations $BR_1$ and $BR_2$ are equal to a sum of values from the test set and that the modular difference between the bids represented by $BR_1$ and $BR_2$ are equal to a sum of values from the test set, as described in more detail with reference to FIG. 7.

When each of the bids corresponding to the bid representations is verified to be equal to a sum of values in the test set, then each of the bids is verified to be less than the reference value. Therefore, the highest bid can be identified as such by verifying that a difference between the highest bid and each other bid is equal to a corresponding difference value that is a sum of values in the test set. Because these relationships between the bids can be verified without revealing the actual values of the bids, the winning bid in auction results can be verified to be the highest bid without revealing the actual values of the bids.

Figure 4:
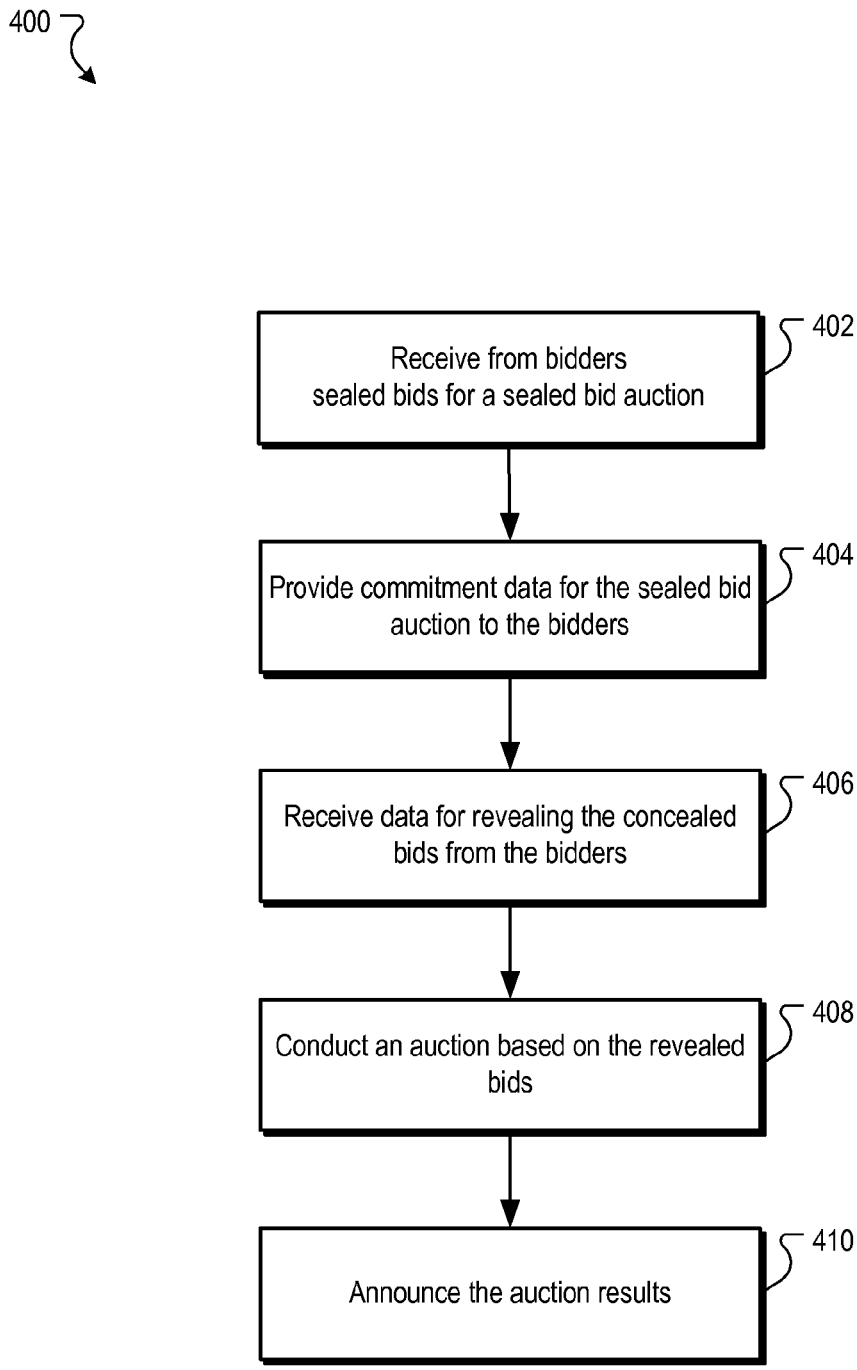
FIG. 4 is a flow chart of an example process for maintaining bid integrity for a sealed bid auction.

FIG. 4 is a flow chart of an example process 400 for maintaining bid integrity for a sealed bid auction. The process 400 is a process by which the integrity of sealed bids is maintained by concealing the bids from an auctioneer until the auctioneer provides commitment data that represents each of the bids that will be used in the auction. The commitment data provides verifiable data with which a secure processor, bidders, or a third party auditor can verify that bids remain sealed prior to the auction. Once the commitment data has been provided, data necessary for revealing the values of the bids is provided to the auctioneer and the auctioneer performs the auction.

In some implementations, the process 400 can be implemented by the verification subsystem 120 and/or the advertisement management system 110 of FIG. 1 that allocates advertisement slots to advertisers based on the outcome of an auction. In other implementations, the process 400 can be implemented as instructions on a computer readable medium that upon execution cause a computer or other processing device to perform the actions of the process 400. The process 400 is described with reference data being received from and provided to bidders, but the data can also be provided to and/or received from a secure processor that performs the operations on behalf of a bidder.

Sealed bids for a sealed bid auction are received from bidders (402). The sealed bids can be received, for example, by a verification subsystem that is part of an advertisement management system that selects advertisements for presentation with resources based on the outcomes of auctions. The bidders can, for example, advertisers that are providing bids for allocation of advertisement slots.

In some implementations, the sealed bids are bids that are encrypted with an encryption key that is not initially known by an auctioneer performing the auction. For example, an advertiser can encrypt its bid with a symmetrical encryption/decryption key $K_b$ that is initially unknown to the advertisement management system and/or verification subsystem. By providing a bid that is encrypted by $K_b$, the value of the advertiser's bid is not identifiable until the bid is decrypted using the advertiser's key $K_b$.

Commitment data for the sealed bid auction is provided to the bidders (404). In some implementations, the commitment data is provided to the bidders at a closing time for the auction. The closing time for the auction is a time after which no additional bids are accepted for the auction. The closing time for the auction can be, for example, a specified amount of time prior to the time at which the auction is to be performed. For example, the closing time for an auction may be 1 minute, 10 minutes, 1 hour prior to the auction. Additionally, the closing time may be a receipt time of a page request for a web page for which advertisement slots are being auctioned.

At or after the close time for the auction, the verification subsystem generates commitment data based on the sealed bids that have been received for the auction. In some implementations, the commitment data is generated based on a hash function of the sealed bids. For example, the verification subsystem can generate a concatenated vector of the sealed bids ($SB_i$) and a unique auction identifier for the auction (i.e., (auction_id||SB1||SB2|| . . . ||SBn). In turn, the verification subsystem computes a hash of the concatenated vector and defines this hash as the commitment data for the auction.

The commitment data is provided to each of the bidders and posted to a network location that is accessible by each of the bidders. For example, the commitment data can be provided to advertisers by providing the commitment data in an e-mail to the bidders or providing the commitment data to an advertisement management account for the advertiser. When a secure processor is performing actions on behalf of advertisers, the commitment data can be provided to the secure processor. The network location to which the commitment data is posted can be, for example, a bulletin board to which each of the bidders has access.

Providing the commitment data to the bidders as well as a network location enables each bidder to verify that the commitment data that it received is the same commitment data that is posted to the network location. The ability to verify the commitment data provides assurance to the advertiser that each advertiser received the same commitment data and that the no bids were revealed prior to the closing time for the auction.

Data for revealing sealed bids is received from the bidders (406). In some implementations, each of the bidders provides a decryption key for decrypting their bid in response to receiving the commitment data. For example, after receiving the commitment data, each of the bidders can provide the symmetric key $K_b$ that was originally used to encrypt their respective bids.

The symmetric key can be provided, for example, using a public/private encryption methodology so that the symmetric key can be concealed from third party interceptors. When a secure processor is performing actions on behalf of the advertisers, the secure processor can verify that the commitment data provided to each of the advertisers matches the posted commitment data and provided to each bidder. In turn, the secure processor can provide each advertiser's symmetric key to the advertisement management system. A secure processor that has access to each of the sealed bids can also compute a hash of a concatenated vector of the sealed bids and the auction identifier for the auction. Additionally, the secure processor can verify that the auction identifier has not previously been used.

An auction is conducted based on the revealed bids (408). In some implementations, the auction is a second price auction where the verification subsystem reveals each bid using the symmetric keys that were provided for the bidders and identifies a highest bidder for the item being auctioned. The highest bidder is defined as the winner of the auction and pays a price for the item based on the second highest bid. If a second item is also being allocated based on the auction, a second highest bidder can be awarded the second item and pay a price based on the third highest bid.

The auction results are announced (410). In some implementations, announcement of the auction results is performed by informing the bidders of the items that they are being allocated and the respective prices that they will pay for the items. However, the values of other bids that were used in the auction generally remain concealed from the bidders to protect the secrecy of each bidder's bid. Therefore, if an auctioneer provides verification of the integrity of the auction results, for example, by verifying that the winner of the auction provided the highest bid and paid the second highest price, the auctioneer should do so without revealing the values of any of the bids.

In some implementations, the auctioneer can verify the results of an auction without revealing actual bid values by verifying that representations of the bids ("bid representations") satisfy a set of verification conditions. For example, the auctioneer can verify that each of the bid representations represents a bid value that is less than a reference value. Additionally, the auctioneer can prove that a modular difference between the highest bid and any other bid is less than the reference value. When both of these conditions are satisfied, for a winning bid, the winning bid is verified as the highest bid.

The first round in the verification of the correctness of the auction is verification that, for every bidder, the multiple encrypted representations of that bidder's bids are essentially all representations of the same bid value, i.e. that for every bidder the representations presented to the verifier by the subsystem are value consistent. This can be accomplished, for example, by the subsystem presenting to the verifier a bidder submitted bid representation and a bid representation from the associated set a value establishing the value consistency of the two representations.

The verifier can then randomly and independently select either the first or the second coordinate of the bid representations to be revealed. In response the verifiable auction subsystem presents to the verifier the decryption key for the requested coordinate of the bidder submitted representation of his bid and the decryption keys for the same coordinate of every representation in the associated set of representations. The verifier now verifies that the bid representations are value consistent using a consistency factor supplied by the subsystem. In some implementations, there are, for every bidder, a specified number of representations unrevealed in this round that can be used to verify relative values of bids, as described with reference to FIG. 7.

Figure 5:
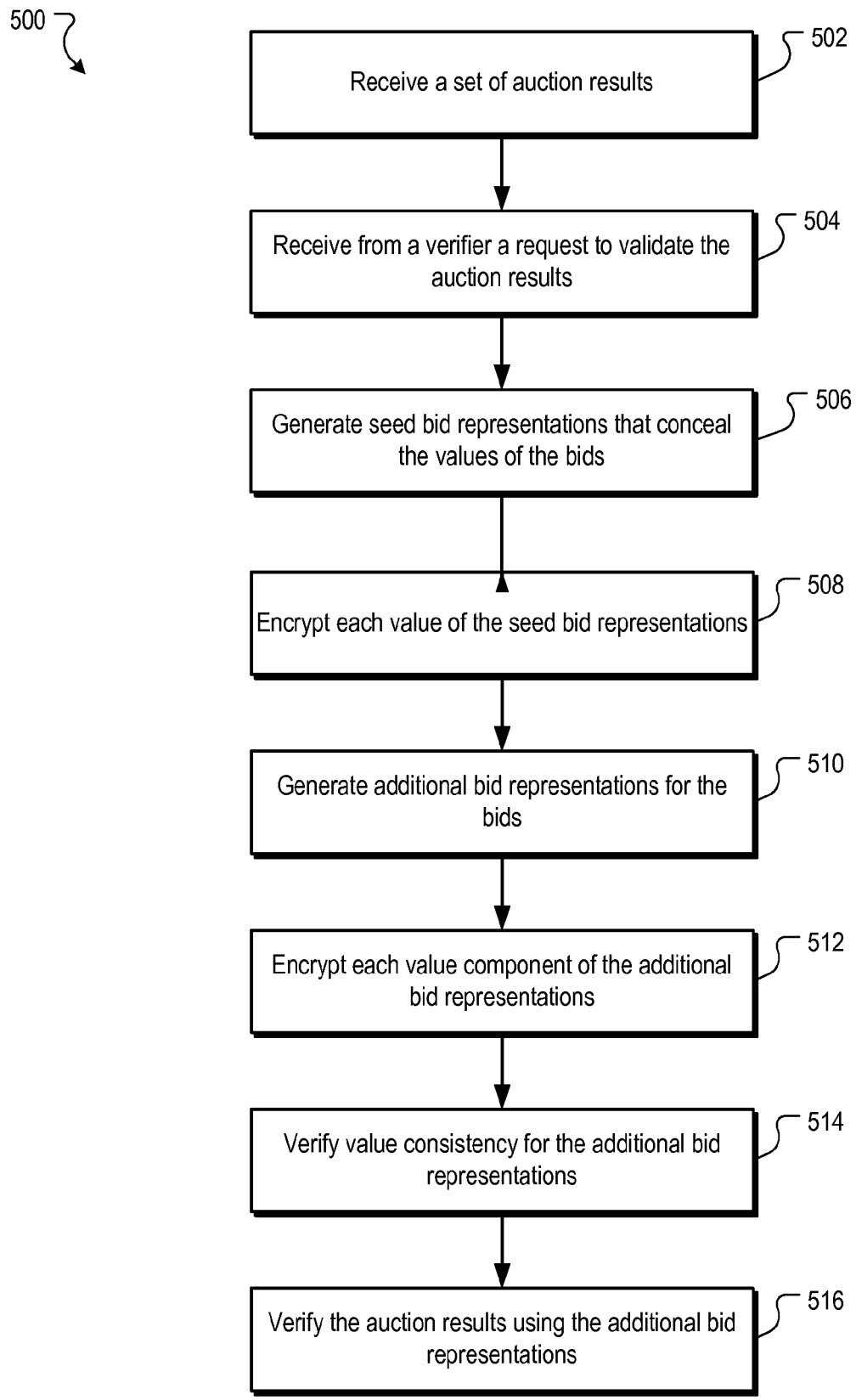
FIG. 5 is a flow chart of an example process for verifying the integrity of auction results.

FIG. 5 is a flow chart of an example process 500 for verifying the integrity of auction results. The process 500 is a process by which bid representations for each bid identified in auction results are used to prove the integrity of the auction results without revealing the actual values of the bids. For example, in response to a request from a verifier for verification of the auction results, the bid representations can be provided to the verifier. One value component of the bid representations can be revealed to the verifier and used to determine whether a set of verification conditions that are used to verify the auction results are satisfied. The verifier can continue to reveal value components of other bid representations and determine whether the value components of the other bid representations also satisfy the set of verification conditions.

In some implementations, the process 500 can be implemented by the verification subsystem 120 and/or the advertisement management system 110 of FIG. 1 that allocates advertisement slots to advertisers based on the outcome of an auction. In other implementations, the process 500 can be implemented as instructions on a computer readable medium that upon execution cause a computer or other processing device to perform the actions of the process 500.

A set of auction results are received (502). In some implementations, the auction results include a list of bidders and corresponding bids that were used for performing an auction. The auction results can be provided, for example, in descending order of bid value. For example, the bid having the highest bid value can be listed first with each subsequent bid in the list being the bid having the next highest value. The set of auction results can be received, for example, from the advertisement management system 110 of FIG. 1.

A request to verify the auction results is received from a verifier (504). The verifier can be, for example, a bidder in the auction, a secure processor performing actions on behalf of a bidder, or a third party auditor. The request can be received, for example, in the form of an e-mail request, selection of a verification button from an advertisement management system user interface, instant message, or other forms of communicating the request. The request can be received at completion of the auction or any time following the completion of the auction.

Seed bid representations that conceal the values of the bids are generated for the bids (506). In some implementations, each bid representation is a vector having two value components. The two value components of each vector representation can be selected, for example, so that the modular sum of the value components is equal to the bid value. For example, a bid of $5.00 can be represented by the two values 14 and 8, when the modular base is 17 (i.e., (14+8)mod 17=15).

The vector representations can be generated, for example, by pseudorandomly selecting a first value component ($u_1$) from a bounded set of numbers and then selecting the second value component ($v_1$) by computing a modular difference between the first value component and the bid value (i.e., (bid−$u_1$)modp, where p is the modular base).

For example, a vector representation for the bid of $5.00 can be generated based on a pseudorandom selection of the number 16 using, for example, a pseudorandom number generator. The number 16 can be defined as the first value component of the vector representation of the bid $5.00. In turn, the second value component of the bid can be selected as (5−16)mod 17=6. Thus, the bid of $5.00 can be represented by the vector (16, 6).

In some implementations, bid representations can be generated based on a bid seed value that is selected by the bidder. The bidder can select a bid seed value, using, for example, a pseudorandom number generator, and provide the bid seed value for initializing the same or another pseudorandom number generator. In turn, the bid seed value initialized pseudorandom number generator can be used for generating the first value components (i.e., u) of vector representations for the bidder's bid.

Using a bid seed value to initialize the pseudorandom number generator enables a same set of random numbers to be generated by the bidder and an auctioneer. For example, when the bidder and the auctioneer use a same pseudorandom number generator algorithm to generate pseudorandom numbers based on a same bid seed value, the set of pseudorandom numbers that are generated for the bidder will match the pseudorandom numbers that are generated for the auctioneer. Bid representations that are generated or computed using the bid seed value are referred to as seed bid representations.

In some implementations, seed bid representations are generated for each bid that was used in the auction and identified by the auction results. For example, a set of forty-five seed bid representations can be generated for each of the bids that are used in the auction. In turn, the seed bid representations can be used to generate a matrix of bid representations. The matrix of bid representations has columns that include one instance of a bid representation for each bid that was used in the auction, while each row can correspond to a particular bidder, such that the bid representations for a particular bidder are included in a single row of the matrix. The matrix can be used, as described below, for facilitating verification of the auction results. The description refers to using the matrix, but independent vectors of bid representations are provided.

Each value component of the seed bid representations is encrypted (508). In some implementations, each value is encrypted by a different encryption key so that separate decryption keys are required to decrypt each value. For example, assuming that a forty-five seed bid representations have been generated for each bid, ninety different encryption keys can be used to respectively encrypt each of the ninety value components of the seed bid representations for the bid.

In some implementations, the unique encryption key that is used to encrypt each component value of the seed bid representations can be selected based on an encryption seed value. For example, the encryption key that is generated for each of the value components can be generated based on a pseudorandom number that is generated by a pseudorandom number generator initialized using the encryption seed value. Thus, as described above, the bidder and the auctioneer can compute the same series of pseudorandom numbers based on the encryption seed value. In turn, the bidder and auctioneer can generate the same encryption keys for the value components based on the series of pseudorandom numbers.

Once the auctioneer and/or the bidder have each encrypted the value components of the seed bid representations for the bidder's bid, the bidder and/or the auctioneer can each generate a concatenated vector of the encrypted component values and compute a hash of the concatenated vector. In turn, the bidder and the auctioneer can post the hash to a network location that is accessible by the bidders that participated in the auction. Therefore, each bidder can access the network location and verify that the hash value posted by the auctioneer and bidder match, thereby verifying the integrity of the seed bid representations. Being able to verify consistency between the hash posted by each bidder and the auctioneer provides assurance to the bidders that the seed bid representations represent the actual values of each bidder's bids.

Additional bid representations for the bids are generated by the auctioneer (510). In some implementations, the number of additional bid representations that are generated can be based on a number of bid representations that are used for each verification of the auction results and the number of verifications of the auction results that are performed. For example, each bid representation is generally only used for one verification of auction result because only one value of each representation can be revealed from each bid representation without revealing the actual value of the bid. Additional representations of the bids can be generated as needed to perform additional verifications of the auction results.

In some implementations, the auctioneer independently generates additional representations of each bid. For example, the auctioneer can pseudorandomly select first value components for the additional bid representations using a pseudorandom number generator and compute the second value components of the additional bid representations based on the bid values and the first value components, as described above. The pseudorandomly selected numbers for the first value components are not required to be selected using the bid seeds provided by the bidders because the integrity of the additional bid representations can be verified, as described with reference to FIG. 6.

Additional bid representations for each bid is included in a new column of the bid representation matrix at a row corresponding to the bid represented by the additional bid representation. A set of additional bid representations that includes a single bid representation for each bid defines a new column of the bid representation matrix. Thus, the bid representation matrix can be updated to include additional columns for the additional bid representations. The number of additional columns included in the bid representation matrix can be, for example, equal to the additional bid representations that are generated for each bid.

Each value component of the additional bid representations is encrypted (512). In some implementations, the additional bid representations are encrypted with an independent encryption key. The independent encryption key for each value component can generated, for example, based on a pseudorandom number that is selected by the auctioneer. The pseudorandom numbers used to generate encryption keys for the value components of the additional bid representations are not required to be selected using the encryption seeds that are provided by the bidders because the encryption keys for verifying the integrity of the additional bid representations are provided, as described below.

Value consistency is verified for the additional bid representations (514). In some implementations, the value consistency for the additional bid representations can be verified by verifying that the additional bid representations and the seed bid representations for the same bid are value consistent (i.e., represent the same value). When the columns of the bid representation matrix each include a single bid representation for each of the bidders, the verification of value consistency can be performed on a per-column basis.

For example, the verifier can select a seed column (i.e., a column containing seed bid representations) and a set of additional columns from the bid representation matrix for performing the verification of value consistency. Once the verifier has selected the seed column and a set of the additional columns, the verifier can engage in an interactive process by which the value components of seed bid representations and additional bid representations are revealed and used to determine whether the revealed value components and a verification factor satisfy a value consistency relationship, as described with reference to FIG. 6. The interactive process can iteratively repeat until the verifier is satisfied that the additional bid representations are value consistent with the seed bid representations, as described in more detail with reference to FIG. 6.

Once the verifier is satisfied that the additional bid representations are value consistent, the results of the auction can be verified using the additional bid representations (516). In some implementations, verification of the auction results includes verifying that the winning bid was the highest bid.

The verification of auction results can also include verifying that winning bidder paid the second highest price.

Verification of the auction results can be performed without revealing the actual bid values based on a set of verification conditions. For example, to demonstrate that a winning bid is the highest bid, it is sufficient to show that the value of the winning bid is higher than the other bids in the auction (i.e., winning_bid>every other bid). Similarly, the second highest bid can be verified as such by demonstrating that the second highest bid is greater and all bids other than the highest bid.

In some implementations, the winning bid can be verified to be the highest bid by verifying that every bid in the auction is less than a reference value and that respective modular differences between the winning bid and each other bid is also less than the reference value, as described in more detail with reference to FIG. 7.

Prior to using the additional bid representations (i.e., bid representations generated by the auctioneer) to verify the auction results, the verifier may request that the auctioneer verify the integrity of the additional bid representations. In some implementations, the auctioneer can verify the integrity of the bid additional bid representations by verifying that the additional bid representations are value consistent with other verifiable bid representations for the same bid. For example, additional bid representations can be verified to be value consistent with seed bid representations that are verifiable as described with reference to FIG. 5.

Figure 6:
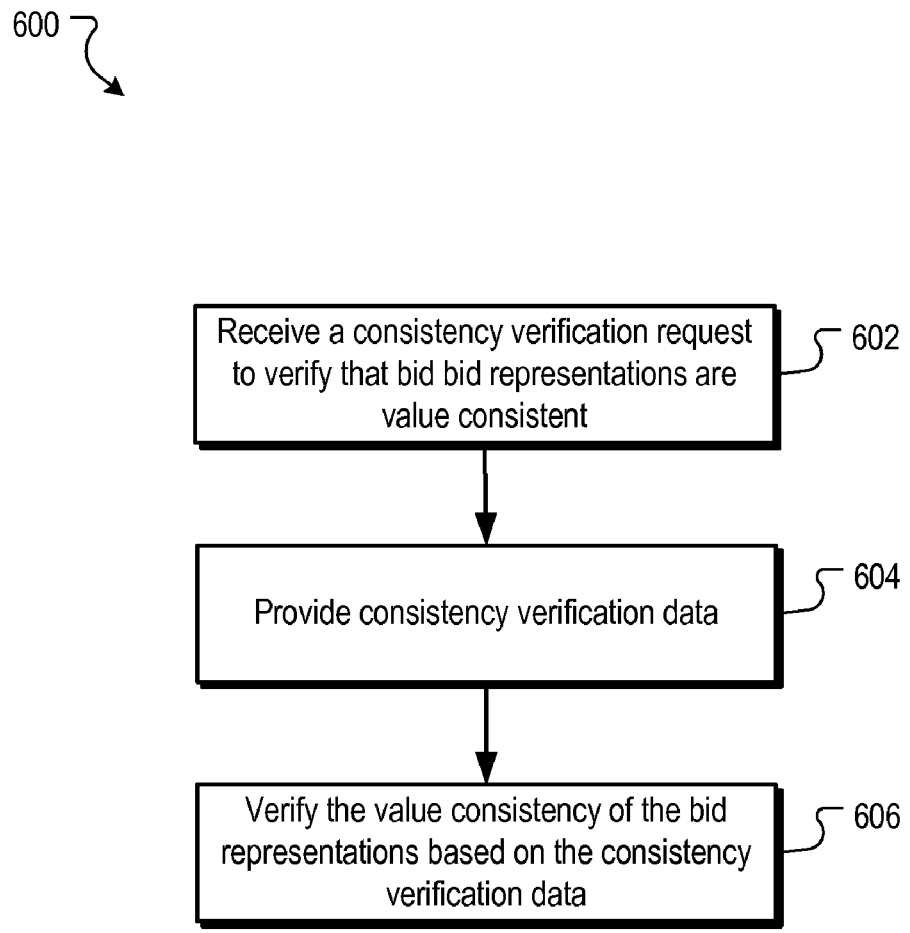
FIG. 6 is a flow chart of an example process for verifying the integrity of bid representations.

FIG. 6 is a flow chart of an example process 600 for verifying the integrity of bid representations. The process 600 is a process by which verifiable bid representations (i.e., seed bid representations) are used to verify the integrity of additional bid representations that have been generated by the auctioneer. The process 600 is implemented so that the integrity of the bid representations is verified without revealing the actual bid values represented by the bid representations. For example, a set of bid representations including at least one verifiable bid representation and at least one additional bid representation can be provided to the verifier with a verification factor for the bid representations. In turn, either the first or second value components of the bid representations are revealed to the verifier for verification that that additional bid representation is value consistent with the verifiable bid representation using the verification factor.

In some implementations, the process 600 can be implemented by the verification subsystem 120 and/or the advertisement management system 110 of FIG. 1 that allocates advertisement slots to advertisers based on the outcome of an auction. In other implementations, the process 600 can be implemented as instructions on a computer readable medium that upon execution cause a computer or other processing device to perform the actions of the process 600.

A consistency verification request to verify that bid representations are value consistent is received (602). In some implementations, the consistency verification request is received from a verifier that has requested verification of auction results. The consistency verification request can be received, for example, in response to a selection of a set of additional columns from a bid representation matrix. As described above, each of the additional columns includes, for example, an additional bid representation for each of the bids that were used in an auction. The consistency verification request may also be included in a request to verify auction results.

In some implementations, the verification request can include a reference to the additional columns of the bid representation matrix for which value consistency is to be verified. In other implementations, the additional columns can be pseudorandomly selected and provided to the verifier.

Consistency verification data are provided in response to the verification request (604). In some implementations, the consistency verification data includes bid representations for which value consistency is to be verified. For example, the consistency verification data can include additional bid representations from a set of additional columns from the bid representation matrix and at least one seed column of seed bid representations. As described above, each value component of each bid representation can be encrypted with an independent encryption key that is initially unknown by the verifier.

The consistency verification data can also include decryption keys for either the first or the second value component for each bid representation included in the consistency verification data. In some implementations, the decryption keys are provided in response to a request by a verifier for decryption keys for either the first or the second value components. For example, the verifier can provide or select a value 1 or 2 to specify the value components for which the decryption keys should be provided. The request can be received, for example, after the bid representations are provided to the verifier.

Providing a decryption key for only one of the value components of the bid representations enables the true values of the bids to continue to be concealed. For example, the value 16 can be the first value component for virtually any bid value. Therefore, providing only the decryption key to reveal the value 16 provides very little data for determining the true value of the bid represented by the value component 16. However, when the second value component of 6 is also known, there are fewer bids that can be represented by the vector (16,6). Additionally, with knowledge of the modular base with which the bid representations were computed (e.g., 17), the bid value can be directly computed to be $5.00. Thus, by providing only one value component of the bid representations, the true values of the bid remain concealed.

The consistency verification data also include a verification factor that is used by the verifier to test the value consistency of the bid representations. In some implementations, the verification factor is a value that satisfies a set of value consistency relationships for the component values of the bid representations. The value consistency relationships can be relationships that demonstrate that bid representations are value consistent. Example consistency relationships are provided by relationships (3) and (4).

$$u_a = u_b + r \qquad (3)$$

$$v_a = v_b - r \qquad (4)$$

According to relationships (3) and (4), the values represented by two bid representations $(u_a, v_a)$ and $(u_b, v_b)$ are equal, only when there exists a verification factor that satisfies each of the relationships (3) and (4).

For example, assume that a bid of $9.00 is represented by bid representations (4,5) and (15, 11) with a modular base of 17 and that the value components are concealed from the verifier (i.e., encrypted). In this example, the verifier can be provided with the verification factor of 6 prior to selecting a value component to reveal.

Once the verifier has received the concealed (i.e., encrypted) bid representations and the verification factor, the verifier can request that the first value component of each bid representation be revealed. In response to the request, the values 4 and 15 are revealed.

The bid representations are verified as value consistent based on the consistency verification data (606). For example, using the verification factor of 6, the verifier can verify that (15+6)mod 17=4. Therefore, the values represented by the two bid representations are verified to represent the same value, while not revealing the actual value of the bid.

A verifier can continue to repeat the verification process for any number of additional bid representations for the same bid until the verifier is satisfied that the bid representations are value consistent. Once the verifier is satisfied that the additional bid representations are value consistent, the results of the auction can be verified. Satisfaction that the additional bid representations are value consistent can be achieved, for example, by the secure processor verifying value consistency for a threshold number of bid representations on behalf of the bidders. For example, the secure processor can verify value consistency for 20 columns of additional bid representations, which provides a probability of less than 1/1,000,000 that any of the bid representations are not value consistent, as described in more detail below.

Figure 7:
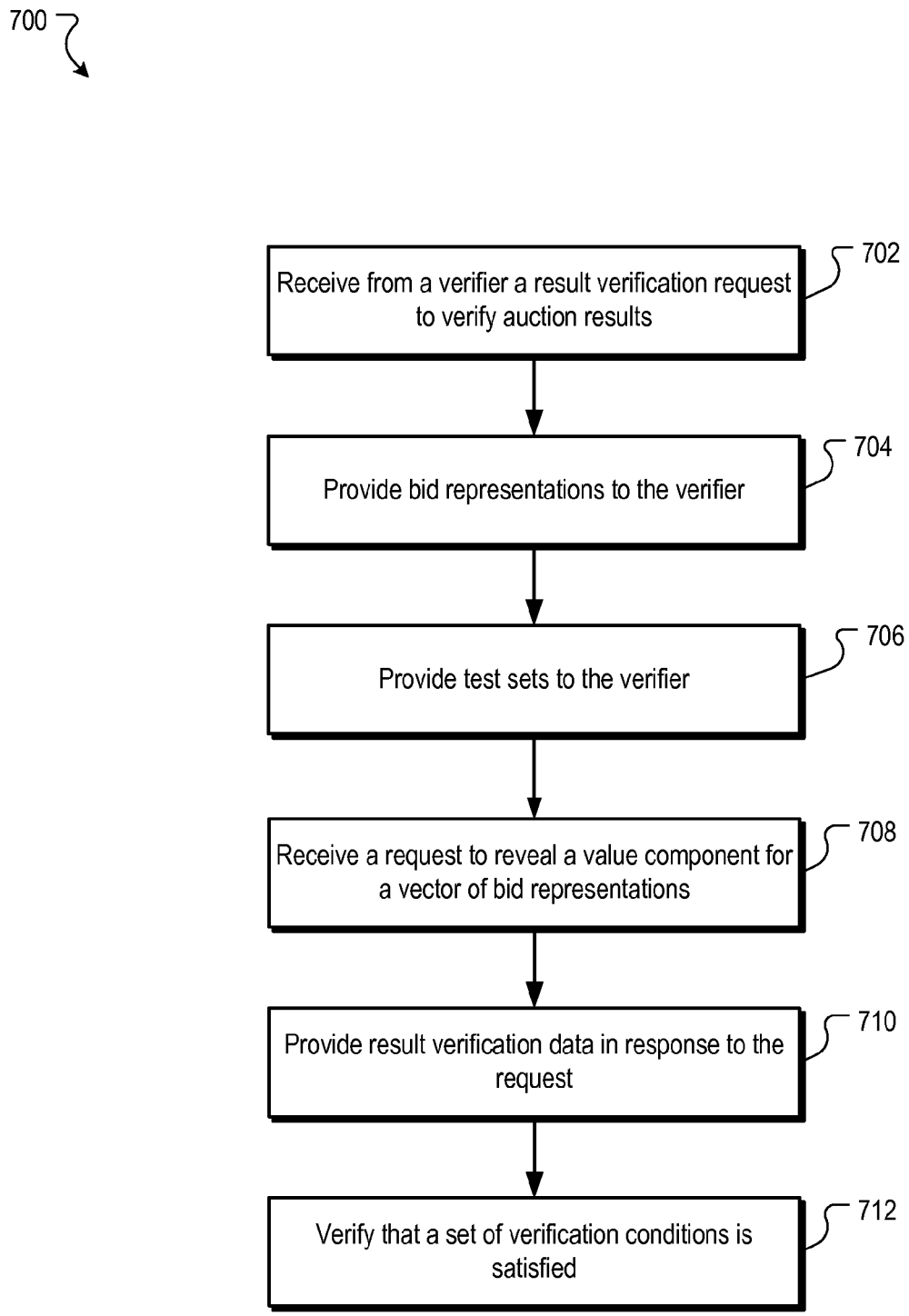
FIG. 7 is a flow chart of an example process for verifying auction results without revealing actual values of the bids.

FIG. 7 is a flow chart of an example process 700 for verifying auction results without revealing actual values of the bids. The process 700 is a process by which the auction results can be verified based on one value component for each of a set of bid representations, verification factors for a set of bid relationships, and a test set.

In some implementations, the process 700 can be implemented by the verification subsystem 120 and/or the advertisement management system 110 of FIG. 1 that allocates advertisement slots to advertisers based on the outcome of an auction. In other implementations, the process 700 can be implemented as instructions on a computer readable medium that upon execution cause a computer or other processing device to perform the actions of the process 700.

A result verification request to verify auction results is received from a verifier (702). In some implementations, the result verification request is a request to verify that a winning bid is the highest bid that was received from a bidder. The result verification request can be received, for example, following an announcement of auction results.

Bid representations are provided to the verifier (704). In some implementations, the bid representations are provided as vectors of bid representations. A vector of bid representations can be, for example, pseudorandomly selected columns of a bid representation matrix. For example, in response to the result verification request, a pseudorandom number generator can be used to select a set of columns from the bid representation matrix. The set of columns can include, for example, only columns of the bid representation matrix that have not been previously provided in response to value consistency requests or order verification requests.

In some implementations, the number of vectors of bid representations that are provided can be determined based on a confidence factor. The confidence factor is a measure of confidence that the provided vectors of bid representations provide accurate results. For example, when only one of two value components of a bid representation is revealed to a verifier, there is a 50% chance that incorrect (e.g., manipulated) bid representation values would not be detected by the verifier. However, as multiple representations are provided to the verifier, the chance that incorrect bid representations remain concealed falls such that a measure of confidence that the results computed by the bid representations are accurate increases.

For example, when 20 columns are used to verify auction results, the chance of incorrect bid representations remaining undiscovered is $(1/2)^{20}$. Therefore, if the confidence factor were computed as the inverse of the chance that incorrect bid representations remain undiscovered, the confidence factor would be greater than 1,000,000 when twenty vectors of bid representations are used.

Test sets are provided to the verifier (706). In some implementations, the test sets are provided to the verifier in response to the result verification request. The test sets can be provided, for example, with the vectors of bid representations. In some implementations, two or more test sets are provided for each of vectors of bid representations.

A test set is a set of values that, when summed, are less than a reference value that can be used for proving relative values of bids, as described below. The reference value can be set to a value that is greater than the maximum value of a valid bid that can be accepted from a bidder. For example, the reference value can be set to $2^{20}$ when bids for the auction are not greater than 1,000,000. In this example, the test set can be represented by $2^0+2^1+2^2+ \ldots +2^{19}$. Additionally, any number of values of 0.0 can be include in the test set because they will not increase the sum of the values of the test set. In some implementations, the number of values of 0.0 that are included in the test set correspond to the number of powers of two that are included in the test set to conceal values of bids, as described below. Thus, when a test set includes twenty powers of two (i.e., $2^0 \ldots 2^{19}$), the test set can also include twenty instances of 0.0 for a total of 40 values.

Each test set can be arranged as a unique permutation of the values that are included in the test set. For example, if test sets includes eight values (0,0,0,0,1,2,4,8) the permutations can include (0,1,0,2,8,0,0,4), (0,0,8,1,0,2,4,0), and other permutations of the eight values. Similarly, when the test sets include 40 values (i.e., twenty zeroes and twenty powers of two), each test set can be a unique permutation of the 40 values. Each test set can be encrypted with a unique encryption key that is initially unknown to the verifier so that the contents of all test provided test sets remain concealed.

Any value less than the reference value can be represented by summing a selection of values from the test set. In some implementations, a value can be represented by values in the test set by selecting a set of values from indexed positions of the test set that sum to the value to be referenced. For example, the value 7 can be computed based on the test set $(2^0,0,0,2^3,2^2,0,2^1,0)$ having indexed positions (i1, i2, i3, i4, i5, i6, i7, i8) by summing the values at the indexed positions i1, i5, and i7 (i.e., $2^2+2^1+2^0$), which are all members of the test set. The value that is computed using the test set can be represented as a two value component vector, similar to the bid representations. Representing the value computed from the test set as a two value component vector facilitates verification of the auction results without revealing the actual values of the bids, as described below.

Because two test sets are provided and each test set is a unique permutation of an equal number of zeros and powers of two, the test sets can also be used to prove that the sum of a test set is less than the reference value by revealing one full test set so that the verifier can verify that each value in the test set is zero or a unique power of two and that the sum of the values the test set are less than the reference value. Since the other test set is another unique permutation of the values in the test set, revealing the first test set provides no information of the locations of the values in the second test set.

A request to reveal a value component for a vector of bid representations is received (708). The request can include a reference to the vector of the bid representations to which the request is directed. For example, the request can identify the column of the matrix that corresponds to the vector or a vector identifier that is associated with the vector. The request can include, for example, a request for decryption keys for decrypting one of the value components for each of the bid representations in the vector.

The request can also request a decryption key for a test set that the verifier will verify is a valid test set. For example, when the verifier wants to verify that the test set is less than the reference value, the verifier can request a decryption key to reveal one of the test sets. In response, the auctioneer can provide the requested decryption key for the test set so that the verifier can verify that the sum of the values in the test set are less than the reference value. The other test set remains concealed and will be used for verifying the auction results.

The to reveal a value component can be, for example, a selection or submission of integers corresponding to the test set that the verifier is requesting be revealed as well as the value components for each of the bid representations for which the verifier is requesting decryption keys. For example, the request for the decryption keys for the value components can include a value "1.0" when the verifier is requesting decryption keys for the first value component of each bid representation, while a request for the second value component of each bid representation can include a value "2.0." Similarly, the request for the decryption key for the first of two test sets for the vector of bid representations can be specified by the integer "1.0," while a request for the decryption key for the second test set can specified by the integer "2.0." The values are independently selectable for the test sets and the value components.

Result verification data are provided in response to the request (710). In some implementations, the result verification data include decryption keys for one component value for each the bid representations and one of the test sets. As described above, providing a decryption key for only one of the value components of the bid representations enables the actual values of the bids to remain concealed, while still facilitating verification of the auction results.

The result verification data can also include data representing a set of verification conditions that, when satisfied, demonstrate that the winning bid is the highest bid. The set of verification conditions can specify that the value of each bid, as represented by the bid representations, is equal to a sum of values included in the test set, and therefore, less than the reference value, as represented by relationship (3).

$$B_x = TSV_1 + \ldots + TSV_i \tag{3}$$

Where,
$B_x$ is a bid value that was used in the auction;
$TSV_i$ is a value in a test set at a location i;
$1 \leq i \leq 40$ for a test set having 40 values; and
$TSV_1 + \ldots + TSV_{40} \leq$ reference value.

Additionally, the set of verification conditions can specify that the respective modular mathematical difference between the highest bid and each other bid is equal to a sum of values in the test set, and therefore, less than the reference value, as represented by relationship (4).

$$(B_{win} - B_y) \bmod p = TSV_1 + \ldots + TSV_i \tag{4}$$

Where,
$B_{win}$ is the winning bid;
$B_y$ is a bid value other than $B_{win}$ that was used in the auction;
$TSV_i$ is a value in a test set at a location i;
$1 \leq i \leq 40$ for a test set having 40 values;
p is a primary number at least twice as large as the reference value; and
$TSV_1 + \ldots + TSV_{40} \leq$ reference value.

When the set of verification conditions are satisfied, the winning bid is proven to be greater than every other bid. Each bid is specified as being less than the reference value according to relationship (3), such that if a value $B_y$ exists that is larger than $B_{win}$, relationship (4) will not be satisfied. For example, if there exists a value $B_y$ that is larger than $B_{win}$ then there will be a "rollover" when the modular difference is computed. Because p is at least twice as large as the reference value, the resulting modular value of relationship (4) will be greater than the reference value. Therefore, the modular difference cannot be represented by a sum of the test set, which provides a maximum value that is less than the reference value.

In some implementations, the set of verification conditions are provided in a form so that they can be proven to be satisfied without revealing the values of the bids by using a bid representations. For example, satisfaction of the set of verification conditions can be demonstrated using one component value from each of the bid representations for the bids.

When bid representations are used to verify the set of verifications a verification factor is also provided with the result verification data. Separate verification factors can be provided for each bid in order to verify that the bid is equal to the value represented by the test set according to relationship (3). The verification factors that are provided for verifying relationship (3) are applied to the value components of the value represented by the test set, in a manner similar to that described with reference to FIG. 6, and as represented by relationships (5) and (6).

$$u_x = u_t + r \tag{5}$$

Where,
$u_x$ is a first value component of a bid $B_x$ that was used in the auction;
$u_t$ is a first value component of the value represented by the test set; and
r is the verification factor.

$$v_x = v_t - r \tag{6}$$

Where,
$v_x$ is a second value component of a bid $B_x$ that was used in the auction;
$v_t$ is a second value component of the value represented by the test set; and
r is the verification factor.

Verification factors are also provided for each pair of bid representations and corresponding modular difference value being represented by the test set in relationship (4). The value component for each of the bid representations and the verification factor are used to verify that relationship (4) is satisfied according, for example, to either relationship (7) or relationship (8).

$$(u_{win} - u_y) \bmod p = u_d + r \tag{7}$$

Where,
$u_{win}$ is first value component for the winning bid;
$u_y$ is a first value component for a bid other than $B_{win}$ that was used in the auction;
$u_d$ is a first value component for the modular difference value represented by the test set; and
p is a primary number at least twice as large as the reference value.

$$(u_{win} - u_y) \bmod p = u_d + r \tag{8}$$

Where, $u_{win}$ is a second value component for the winning bid;

$u_y$ is a second value component for a bid other than $B_{win}$ that was used in the auction;

$u_d$ is a second value component for the modular difference value represented by the test set; and p is a primary number at least twice as large as the reference value.

Satisfaction of a set of verification conditions is verified (712). In some implementations, the set of verification conditions includes the relationships 5-8. For example, revealed value components of the winning bid and each other bid can be iteratively input to the relationships 5-8 to verify that the bid representation for the winning bid is greater than each other bid.

Once the verification conditions are verified to exist for the winning bid, satisfaction of the set of verification conditions can continue to be verified for other bids in the auction results. For example, the relationships (5) and (7) or (6) and (8) can be verified for the bid representation of an auction runner-up to confirm that the runner-up provided the second highest bid and/or that the winner of the auction paid a price equal to the second highest bid.

Satisfaction of the verification conditions can also be repeated for additional sets of bid representations. For example, another column of the bid representation matrix can be selected to repeat the result verification process. Satisfaction of the set of verification conditions can be performed, for example, by a verifier or by the verification subsystem and the results provided to the verifier.

Figure 8:
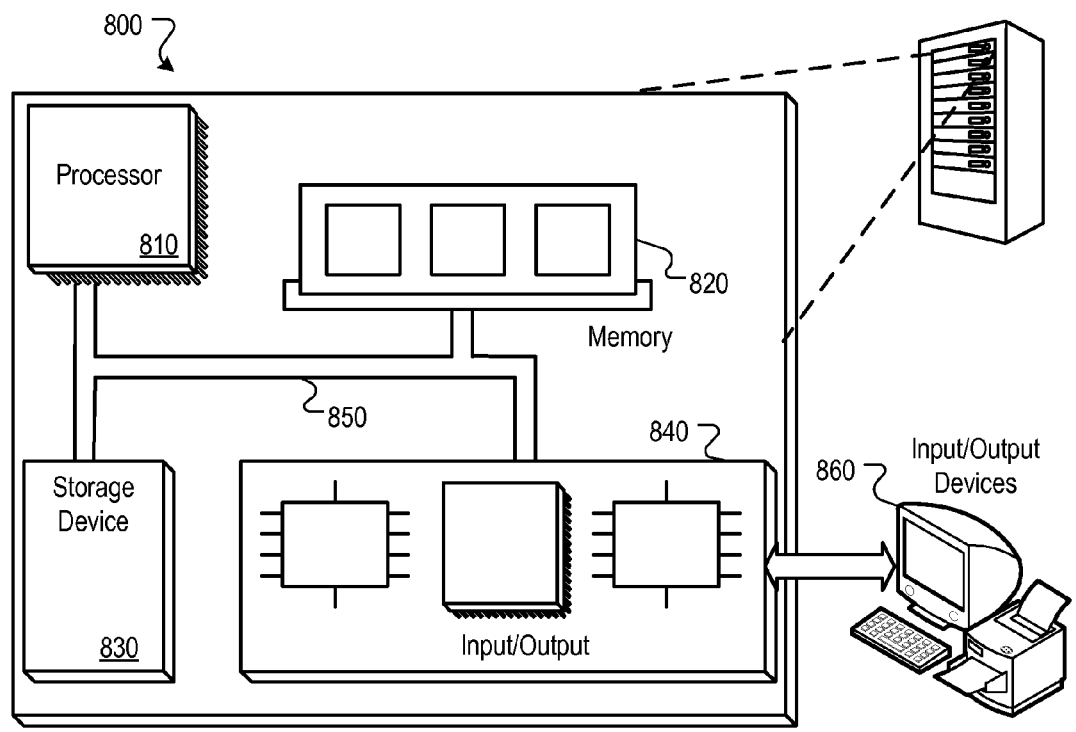
FIG. 8 is block diagram of an example computer system that can be used to generate commitment data and verify auction results.

FIG. 8 is block diagram of an example computer system 800 that can be used to generate commitment data and verify auction results. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

The verification subsystem 120 and/or advertisement management system 110 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The verification subsystem 120 and/or advertisement management system 110 can be distributively implemented over a network, such as a server farm, or can be implemented in a single computer device.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method, comprising:
receiving, by a data processing apparatus and for each of a plurality of bidders, a sealed bid that has been encrypted with an encryption key, a bid seed value, and an encryption seed value;

generating, by a data processing apparatus, commitment data based on the sealed bid for each of the plurality of bidders, the generation of the commitment data comprising:
   creating a concatenated vector that includes a concatenation of every sealed bid received from the plurality of bidders; and
   computing, as the commitment data, a hash of the concatenated vector;
providing the commitment data to the plurality of bidders;
decrypting the sealed bid for each of the plurality of bidders,
conducting an auction based on the decrypted bids;
for each received sealed bid:
   generating a plurality of bid representations for the sealed bid, the generation of each bid representation comprising:
      generating a first coordinate of the bid representation using a first random number generating function and the bid seed value for the sealed bid; and
      generating a second coordinate of the bid representation based on a modular difference between a value of the sealed bid and the first coordinate;
   generating a set of different encryption keys for each of the first coordinate and the second coordinate, each set of different encryption keys being generated using a second random number generating function and the encryption seed value for the sealed bid;
   encrypting the first coordinate with a first of the encryption keys;
   encrypting the second coordinate with a second of the encryption keys;
   providing, to a secure processor, a set of decryption keys that reveals only one of the encrypted first coordinate or the encrypted second coordinate; and
   providing, to the secure processor, at least a portion of the bid representations that were generated for the sealed bid and a verification factor that demonstrates value consistency among the provided bid representations independent of revealing an actual value of the sealed bid.

2. The method of claim 1, wherein the first random number generating function and the second random number generating function are each publicly available to the bidders.

3. The method of claim 1, wherein receiving a sealed bid for a bidder comprises receiving a sealed bid that includes data indicative of a commitment to the sealed bid by the bidder.

4. The method of claim 1, further comprising:
   receiving, from a verifier, a request to verify auction results for the auction, the auction results specifying a winning bidder;
   generating two encrypted test sets, each of the test sets including a set of values, a sum of which is less than a reference value, the reference value being greater than any bid in the auction;
   providing, to the verifier, the two encrypted test sets; and
   providing, to the verifier, result verification data for verifying the auction results based, at least in part, on the two encrypted test sets.

5. The method of claim 4, wherein receiving a request to verify the auction results comprises receiving a request to verify that the winning bidder provided a highest bid relative to other bids used in the auction.

6. The method of claim 4, wherein providing result verification data comprises:
   providing a set of verification conditions that, when satisfied, demonstrate that the winning bid is a highest bid;
   providing a test set decryption key that reveals only one of the two encrypted test sets.

7. The method of claim 1, wherein providing a set of decryption keys comprises providing a set of decryption keys that reveal each first value component of each bid representation in a vector of bid representations that includes a bid representation for each of the bidders.

8. The method of claim 1, further comprising:
   generating, for at least a portion of the sealed bids, additional bid representations that are generated independent of the bid seed value.

9. The method of claim 8, further comprising:
   receiving a consistency verification request that includes a request for verification that the additional bid representations are value consistent with the bid representations that were generated based on the bid seed value; and
   providing consistency verification data for verifying that the additional bid representations are value consistent with the bid representations that were generated based on the bid seed value.

10. The method of claim 9, wherein providing consistency verification data comprises:
    generating a verification factor specifying a value that satisfies a value consistency relationship for component values of bid representations that represent a same bid value; and
    providing the verification factor.

11. A system, comprising:
    an advertisement management system including at least one computer and a data store storing first instructions that cause the advertisement management system to perform an auction based on a set of sealed bids for a plurality of bidders, each of the sealed bids being encrypted, the performance of the auction including:
       decrypting the sealed bid for each of the plurality of bidders,
       performing the auction based on the decrypted bids; and
    a verification subsystem coupled to the advertisement management system, the verification subsystem including at least one computer and a data store storing, for each of the plurality of bidders, a sealed bid that has been encrypted with an encryption key, a bid seed value, and an encryption seed value, the data store further storing second instructions that cause the verification subsystem to:
       generate commitment data for a sealed bid auction based on the sealed bid for each of the plurality of bidders, the generation of the commitment data comprising:
          creating a concatenated vector that includes a concatenation of every sealed bid received from the plurality of bidders; and
          computing, as the commitment data, a hash of the concatenated vector;
       provide the commitment data to the plurality of bidders;
       for each received sealed bid:
          generate a plurality of bid representations for the sealed bid, the generation of each bid representation comprising:
             generating a first coordinate of the bid representation using a first random number generating function and the bid seed value for the sealed bid; and
             generating a second coordinate of the bid representation based on a modular difference between a value of the sealed bid and the first coordinate;

generate a set of different encryption keys for each of the first coordinate and the second coordinate, each set of different encryption keys being generated using a second random number generating function and the encryption seed value for the sealed bid;

encrypt the first coordinate with a first of the encryption keys;

encrypt the second coordinate with a second of the encryption keys;

provide, to a secure processor, a set of decryption keys that reveals only one of the encrypted first coordinate or the encrypted second coordinate; and provide, to the secure processor, at least a portion of the bid representations that were generated for the sealed bid and a verification factor that demonstrates value consistency among the provided bid representations independent of revealing an actual value of the sealed bid.

12. The system of claim 11, wherein the second instructions further cause the verification subsystem to:

generate two encrypted test sets, each of the test sets including a set of values, a sum of which is less than a reference value, the reference value being greater than any bid in the auction;

provide, to a verifier that requested verification of auction results, the two encrypted test sets; and provide result verification data for verifying results of the auction based, at least in part, on the two encrypted test sets.

13. The system of claim 12, wherein the result verification data comprises:

a set of verification conditions that, when satisfied, demonstrate that a winning bid is a highest bid; and a decryption key that reveals only one of the two encrypted test sets.

14. The system of claim 11, wherein the second instructions further cause the verification subsystem to:

generate, for at least a portion of the sealed bids, additional bid representations that are generated independent of the bid seed value.

15. The system of claim 14, wherein the second instructions further cause the verification subsystem to provide consistency verification data for verifying that the additional bid representations are value consistent with the bid representations that were generated based on the bid seed value.

16. The system of claim 15, wherein the consistency verification data comprises:

a verification factor having a value that satisfies a value consistency relationship for component values of bid representations that represent a same bid value.

17. A computer storage device encoded with a computer program comprising instructions that when executed operate to cause one or more computers to perform operations comprising:

receiving, for each of a plurality of bidders, a sealed bid that has been encrypted with an encryption key, a bid seed value, and an encryption seed value;

generating commitment data based on the sealed bid for each of the plurality of bidders, the generation of the commitment data comprising:

creating a concatenated vector that includes a concatenation of every sealed bid received from the plurality of bidders; and computing, as the commitment data, a hash of the concatenated vector;

providing commitment data to the bidders;

decrypting each sealed bid for each of the plurality of bidders;

conducting an auction based on the decrypted bids;

for each received sealed bid:

generating a plurality of bid representations for the sealed bid, the generation of each bid representation comprising:

generating a first coordinate of the bid representation using a first random number generating function and the bid seed value for the sealed bid; and generating a second coordinate of the bid representation based on a modular difference between a value of the sealed bid and the first coordinate;

generating a set of different encryption keys for each of the first coordinate and the second coordinate, each set of different encryption keys being generated using a second random number generating function and the encryption seed value for the sealed bid;

encrypting the first coordinate with a first of the encryption keys;

encrypting the second coordinate with a second of the encryption keys;

providing, to a secure processor, a set of decryption keys that reveals only one of the encrypted first coordinate or the encrypted second coordinate; and providing, to the secure processor, at least a portion of the bid representations that were generated for the sealed bid and a verification factor that demonstrates value consistency among the provided bid representations independent of revealing an actual value of the sealed bid.

18. The computer storage device of claim 17, wherein the first random number generating function and the second random number generating function are each publicly available to the bidders.

19. The computer storage device of claim 17, wherein receiving a sealed bid for a bidder comprises receiving a sealed bid that includes data indicative of a commitment to the sealed bid by the bidder.

20. The computer storage device of claim 17, wherein the computer program further comprises instructions that cause the one or more computers to perform operations comprising:

receiving, from a verifier, a request to verify auction results for the auction, the auction results specifying a winning bidder;

generating two encrypted test sets, each of the test sets including a set of values, a sum of which is less than a reference value, the reference value being greater than any bid in the auction;

providing, to the verifier, the two encrypted test sets; and providing, to the verifier, result verification data for verifying the auction results based, at least in part, on the two encrypted test sets.

21. The computer storage device of claim 20, wherein receiving a request to verify the auction results comprises receiving a request to verify that the winning bidder provided a highest bid relative to other bids used in the auction.

22. The computer storage device of claim 20, wherein providing result verification data comprises:

providing a set of verification conditions that, when satisfied, demonstrate that the winning bid is a highest bid; and providing a test set decryption key that reveals only one of the two encrypted test sets.

23. The computer storage device of claim 17, wherein providing a set of decryption keys comprises providing a set of decryption keys that reveal each first value component of each bid representation in a vector of bid representations that includes a bid representation for each of the bidders.

24. The computer storage device of claim 17, wherein the computer program further comprises instructions that cause the one or more computers to perform operations comprising generating, for at least a portion of the sealed bids, additional bid representations that are generated independent of the bid seed value.

25. The computer storage device of claim 24, wherein the computer program further comprises instructions that cause the one or more computers to perform operations comprising:

receiving a consistency verification request that includes a request for verification that the additional bid representations are value consistent with the bid representations that were generated based on the bid seed value; and providing consistency verification data for verifying that the additional bid representations are value consistent with the bid representations that were generated based on the bid seed value.

26. The method of claim 25, wherein providing consistency verification data comprises:

generating a verification factor specifying a value that satisfies a value consistency relationship for component values of bid representations that represent a same bid value; and providing the verification factor.

* * * * *

UNITED STATES PATENT AND TRADEMARK OFFICE
CERTIFICATE OF CORRECTION

| | | |
|---|---|---|
| PATENT NO. | : 8,239,331 B2 | |
| APPLICATION NO. | : 12/636387 | |
| DATED | : August 7, 2012 | |
| INVENTOR(S) | : Shanmugavelayutham Muthukrishnan, Michael Rabin and Marcel M. Moti Yung | |

It is certified that error appears in the above-identified patent and that said Letters Patent is hereby corrected as shown below:

Claim 6, Column 30, Line 2 – after "bid;" insert -- and --.

Signed and Sealed this
Second Day of October, 2012

David J. Kappos
*Director of the United States Patent and Trademark Office*